(12) United States Patent
DeAnna (10) Patent No.: US 8,132,179 B1
(45) Date of Patent: Mar. 6, 2012

(54) WEB SERVICE INTERFACE FOR MOBILE AGENTS

(75) Inventor: Robert DeAnna, Plano, TX (US)

(73) Assignee: Curen Software Enterprises, L.L.C., Wilmington, DE (US)

( * ) Notice: Subject to any disclaimer, the term of this patent is extended or adjusted under 35 U.S.C. 154(b) by 857 days.

(21) Appl. No.: 11/645,197

(22) Filed: Dec. 22, 2006

(51) Int. Cl.
*G06F 3/00* (2006.01)
*G06F 15/177* (2006.01)

(52) U.S. Cl. .................. 719/311; 719/328; 709/219

(58) Field of Classification Search .................. None
See application file for complete search history.

(56) References Cited

U.S. PATENT DOCUMENTS

| | | |
|---|---|---|
| 4,714,995 A | 12/1987 | Materna et al. |
| 5,465,111 A | 11/1995 | Fukushima et al. |
| 5,495,533 A | 2/1996 | Linehan et al. |
| 5,524,253 A | 6/1996 | Pham et al. |
| 5,604,800 A | 2/1997 | Johnson et al. |
| 5,675,711 A | 10/1997 | Kephart et al. |
| 5,721,912 A | 2/1998 | Stepczyk et al. |
| 5,778,395 A | 7/1998 | Whiting et al. |
| 5,812,997 A | 9/1998 | Morimoto et al. |
| 5,859,911 A | 1/1999 | Angelo et al. |
| 5,930,798 A | 7/1999 | Lawler et al. |
| 5,982,891 A | 11/1999 | Ginter et al. |
| 6,038,500 A | 3/2000 | Weiss |
| 6,055,562 A | 4/2000 | Devarakonda et al. |
| 6,065,040 A | 5/2000 | Mima et al. |
| 6,088,689 A | 7/2000 | Kohn et al. |
| 6,113,650 A | 9/2000 | Sakai |
| 6,134,580 A | 10/2000 | Tahara et al. |
| 6,134,660 A | 10/2000 | Boneh et al. |
| 6,154,777 A | 11/2000 | Ebrahim |
| 6,172,986 B1 | 1/2001 | Watanuki et al. |
| 6,199,195 B1 | 3/2001 | Goodwin et al. |
| 6,202,060 B1 | 3/2001 | Tran |
| 6,209,124 B1 | 3/2001 | Vermeire et al. |
| 6,230,309 B1 | 5/2001 | Turner et al. |
| 6,233,601 B1 | 5/2001 | Walsh |
| 6,256,773 B1 | 7/2001 | Bowman-Amuah |
| 6,272,478 B1 | 8/2001 | Obata et al. |
| 6,282,563 B1 | 8/2001 | Yamamoto et al. |
| 6,282,697 B1 | 8/2001 | Fables et al. |
| 6,304,556 B1 | 10/2001 | Haas |
| 6,330,677 B1 | 12/2001 | Madoukh |
| 6,343,265 B1 | 1/2002 | Glebov et al. |

(Continued)

FOREIGN PATENT DOCUMENTS

JP 2005190103 7/2005

OTHER PUBLICATIONS

Emmerich, et al., "TIGRA—An Architectural Style for Enterprise Application Integration", *IEEE*, (Jul. 2001),p. 567-576.

(Continued)

*Primary Examiner* — Andy Ho
*Assistant Examiner* — Tuan Dao (57) ABSTRACT

Enabling a web service interface for a mobile agent, comprises receiving a tool including data, the data comprising an agent interface file, a URL identifying a name and an initial execution environment of the agent, a name of the web service, and a name of the web service WSDL file, and receiving a request to generate by the tool a web service interface based on the data.

14 Claims, 2 Drawing Sheets

U.S. PATENT DOCUMENTS

| | | | |
|---|---|---|---|
| 6,349,343 B1 | 2/2002 | Foody et al. |
| 6,389,462 B1 | 5/2002 | Cohen et al. |
| 6,438,744 B2 | 8/2002 | Toutonghi et al. |
| 6,442,537 B1 | 8/2002 | Karch |
| 6,452,910 B1 | 9/2002 | Vij et al. |
| 6,477,372 B1 | 11/2002 | Otting |
| 6,496,871 B1 | 12/2002 | Jagannathan et al. |
| 6,600,430 B2 | 7/2003 | Minagawa et al. |
| 6,600,975 B2 | 7/2003 | Moriguchi et al. |
| 6,611,516 B1 | 8/2003 | Pirkola et al. |
| 6,629,032 B2 | 9/2003 | Akiyama |
| 6,629,128 B1 | 9/2003 | Glass |
| 6,662,642 B2 | 12/2003 | Breed et al. |
| 6,671,680 B1 | 12/2003 | Iwamoto et al. |
| 6,687,761 B1 | 2/2004 | Collins et al. |
| 6,701,381 B2 | 3/2004 | Hearne et al. |
| 6,714,844 B1 | 3/2004 | Dauner et al. |
| 6,738,975 B1 | 5/2004 | Yee et al. |
| 6,744,352 B2 | 6/2004 | Lesesky et al. |
| 6,744,358 B1 | 6/2004 | Bollinger |
| 6,744,820 B1 | 6/2004 | Khairallah et al. |
| 6,768,417 B2 | 7/2004 | Kuragaki et al. |
| 6,816,452 B1 | 11/2004 | Maehata |
| 6,831,375 B1 | 12/2004 | Currie et al. |
| 6,851,108 B1 | 2/2005 | Syme |
| 6,862,443 B2 | 3/2005 | Witte |
| 6,876,845 B1 | 4/2005 | Tabata et al. |
| 6,879,570 B1 | 4/2005 | Choi |
| 6,895,391 B1 | 5/2005 | Kausik |
| 6,901,588 B1 | 5/2005 | Krapf et al. |
| 6,904,593 B1 | 6/2005 | Fong et al. |
| 6,931,455 B1 | 8/2005 | Glass |
| 6,931,623 B2 | 8/2005 | Vermeire et al. |
| 6,947,965 B2 | 9/2005 | Glass |
| 6,951,021 B1 | 9/2005 | Bodwell et al. |
| 6,957,439 B1 | 10/2005 | Lewallen |
| 6,963,582 B1 | 11/2005 | Xu |
| 6,981,150 B2 | 12/2005 | Little et al. |
| 6,985,929 B1 | 1/2006 | Wilson et al. |
| 6,993,774 B1 | 1/2006 | Glass |
| 7,010,689 B1 | 3/2006 | Matyas, Jr. et al. |
| 7,043,522 B2 | 5/2006 | Olson et al. |
| 7,047,518 B2 | 5/2006 | Little et al. |
| 7,055,153 B2 | 5/2006 | Beck et al. |
| 7,058,645 B2 | 6/2006 | Seto et al. |
| 7,062,708 B2 | 6/2006 | Mani et al. |
| 7,069,551 B2 | 6/2006 | Fong et al. |
| 7,127,259 B2 | 10/2006 | Ueda et al. |
| 7,127,724 B2 | 10/2006 | Lewallen |
| 7,146,614 B1 | 12/2006 | Nikols et al. |
| 7,146,618 B1 | 12/2006 | Mein et al. |
| 7,172,113 B2 | 2/2007 | Olenick et al. |
| 7,174,533 B2 | 2/2007 | Boucher |
| 7,197,742 B2 | 3/2007 | Arita et al. |
| 7,210,132 B2 | 4/2007 | Rivard et al. |
| 7,213,227 B2 | 5/2007 | Kompalli et al. |
| 7,225,425 B2 | 5/2007 | Kompalli et al. |
| 7,228,141 B2 | 6/2007 | Sethi |
| 7,231,403 B1 | 6/2007 | Howitt et al. |
| 7,237,225 B2 | 6/2007 | Kompalli et al. |
| 7,293,261 B1 | 11/2007 | Anderson et al. |
| 7,376,959 B2 | 5/2008 | Warshavsky et al. |
| 7,475,107 B2 | 1/2009 | Maconi et al. |
| 7,477,897 B2 | 1/2009 | Bye |
| 7,496,637 B2 | 2/2009 | Han et al. |
| 7,499,990 B1 | 3/2009 | Tai et al. |
| 7,502,615 B2 | 3/2009 | Wilhoite et al. |
| 7,506,309 B2 | 3/2009 | Schaefer |
| 7,519,455 B2 | 4/2009 | Weiss et al. |
| 7,566,002 B2 | 7/2009 | Love et al. |
| 7,643,447 B2 | 1/2010 | Watanuki et al. |
| 7,660,777 B1 | 2/2010 | Hauser |
| 7,660,780 B1 | 2/2010 | Patoskie |
| 7,664,721 B1 | 2/2010 | Hauser |
| 7,698,243 B1 | 4/2010 | Hauser |
| 7,702,602 B1 | 4/2010 | Hauser |
| 7,702,603 B1 | 4/2010 | Hauser |
| 7,702,604 B1 | 4/2010 | Hauser |
| 7,774,789 B1 | 8/2010 | Wheeler |
| 7,810,140 B1 | 10/2010 | Lipari et al. |
| 7,823,169 B1 | 10/2010 | Wheeler |
| 7,840,513 B2 | 11/2010 | Hauser |
| 7,844,759 B1 | 11/2010 | Cowin |
| 2001/0029526 A1 | 10/2001 | Yokoyama et al. |
| 2001/0051515 A1 | 12/2001 | Rygaard |
| 2001/0056425 A1 | 12/2001 | Richard |
| 2002/0016912 A1 | 2/2002 | Johnson |
| 2002/0032783 A1 | 3/2002 | Tuatini |
| 2002/0035429 A1 | 3/2002 | Banas |
| 2002/0091680 A1 | 7/2002 | Hatzis et al. |
| 2002/0115445 A1 | 8/2002 | Myllymaki |
| 2002/0116454 A1 | 8/2002 | Dyla et al. |
| 2002/0159479 A1 | 10/2002 | Watanuki et al. |
| 2002/0174222 A1 | 11/2002 | Cox |
| 2002/0196771 A1 | 12/2002 | Vij et al. |
| 2003/0009539 A1 | 1/2003 | Hattori |
| 2003/0018950 A1 | 1/2003 | Sparks et al. |
| 2003/0023573 A1 | 1/2003 | Chan et al. |
| 2003/0033437 A1 | 2/2003 | Fischer et al. |
| 2003/0046377 A1 | 3/2003 | Daum et al. |
| 2003/0046432 A1 | 3/2003 | Coleman et al. |
| 2003/0051172 A1 | 3/2003 | Lordermann et al. |
| 2003/0055898 A1 | 3/2003 | Yeager et al. |
| 2003/0070071 A1 | 4/2003 | Riedel et al. |
| 2003/0101441 A1 | 5/2003 | Harrison et al. |
| 2003/0177170 A1 | 9/2003 | Glass |
| 2003/0191797 A1 | 10/2003 | Gurevich et al. |
| 2003/0191969 A1 | 10/2003 | Katsikas |
| 2003/0225789 A1 | 12/2003 | Bussler et al. |
| 2003/0225935 A1 | 12/2003 | Rivard et al. |
| 2004/0003243 A1 | 1/2004 | Fehr et al. |
| 2004/0015539 A1 | 1/2004 | Alegria et al. |
| 2004/0037315 A1 | 2/2004 | Delautre et al. |
| 2004/0044985 A1 | 3/2004 | Kompalli et al. |
| 2004/0044986 A1 | 3/2004 | Kompalli et al. |
| 2004/0044987 A1 | 3/2004 | Kompalli et al. |
| 2004/0064503 A1 | 4/2004 | Karakashian et al. |
| 2004/0078423 A1 | 4/2004 | Satyavolu et al. |
| 2004/0078687 A1 | 4/2004 | Partamian et al. |
| 2004/0082350 A1 | 4/2004 | Chen et al. |
| 2004/0088369 A1 | 5/2004 | Yeager et al. |
| 2004/0111730 A1 | 6/2004 | Apte |
| 2004/0133656 A1* | 7/2004 | Butterworth et al. ......... 709/219 |
| 2004/0148073 A1 | 7/2004 | Hawig et al. |
| 2004/0153653 A1 | 8/2004 | Abhyankar et al. |
| 2004/0172614 A1 | 9/2004 | Gallagher |
| 2004/0194072 A1 | 9/2004 | Venter |
| 2004/0203731 A1 | 10/2004 | Chen et al. |
| 2004/0220952 A1* | 11/2004 | Cheenath ..................... 707/100 |
| 2004/0221292 A1 | 11/2004 | Chiang et al. |
| 2005/0004727 A1 | 1/2005 | Remboski et al. |
| 2005/0030202 A1 | 2/2005 | Tsuboi |
| 2005/0090279 A9 | 4/2005 | Witkowski et al. |
| 2005/0114832 A1 | 5/2005 | Manu |
| 2005/0141706 A1 | 6/2005 | Regli et al. |
| 2005/0144218 A1 | 6/2005 | Heintz |
| 2005/0163549 A1 | 7/2005 | Shima et al. |
| 2005/0172123 A1 | 8/2005 | Carpentier et al. |
| 2005/0246302 A1 | 11/2005 | Lorenz et al. |
| 2005/0256614 A1 | 11/2005 | Habermas |
| 2005/0256876 A1 | 11/2005 | Eidson |
| 2005/0262155 A1 | 11/2005 | Kress et al. |
| 2005/0273668 A1* | 12/2005 | Manning ..................... 714/39 |
| 2005/0281363 A1 | 12/2005 | Qi et al. |
| 2006/0005177 A1 | 1/2006 | Atkin et al. |
| 2006/0031850 A1* | 2/2006 | Falter et al. ................. 719/320 |
| 2006/0040640 A1 | 2/2006 | Thompson et al. |
| 2006/0041337 A1 | 2/2006 | Augsburger et al. |
| 2006/0048145 A1 | 3/2006 | Celli et al. |
| 2006/0080646 A1 | 4/2006 | Aman |
| 2006/0090103 A1 | 4/2006 | Armstrong et al. |
| 2006/0111089 A1 | 5/2006 | Winter et al. |
| 2006/0112183 A1 | 5/2006 | Corson et al. |
| 2006/0121916 A1 | 6/2006 | Aborn et al. |
| 2006/0123396 A1 | 6/2006 | Fox et al. |
| 2006/0143600 A1 | 6/2006 | Cottrell et al. |
| 2006/0149746 A1 | 7/2006 | Bansod et al. |

| | | |
|---|---|---|
| 2006/0167981 A1 | 7/2006 | Bansod et al. |
| 2006/0173857 A1 | 8/2006 | Jackson |
| 2006/0190931 A1 | 8/2006 | Scott et al. |
| 2006/0200494 A1 | 9/2006 | Sparks |
| 2006/0206864 A1 | 9/2006 | Shenfield et al. |
| 2006/0220900 A1 | 10/2006 | Ceskutti et al. |
| 2006/0221901 A1 | 10/2006 | Yaqub et al. |
| 2006/0245406 A1 | 11/2006 | Shim |
| 2006/0256008 A1 | 11/2006 | Rosenberg |
| 2006/0272002 A1 | 11/2006 | Wightman et al. |
| 2007/0004432 A1 | 1/2007 | Hwang et al. |
| 2007/0015495 A1 | 1/2007 | Winter et al. |
| 2007/0026871 A1 | 2/2007 | Wager |
| 2007/0103292 A1 | 5/2007 | Burkley et al. |
| 2007/0112773 A1 | 5/2007 | Joyce |
| 2007/0223432 A1 | 9/2007 | Badarinath |
| 2007/0243880 A1 | 10/2007 | Gits et al. |
| 2008/0077667 A1 | 3/2008 | Hwang et al. |
| 2010/0161543 A1 | 6/2010 | Hauser |
| 2010/0223210 A1 | 9/2010 | Patoskie |
| 2010/0235459 A1 | 9/2010 | Wheeler |

OTHER PUBLICATIONS

Bussler, Christoph "The Role of B2B Engines in B2B Integration Architectures", *ACM*, (Mar. 2002),67-72.

Jandl, et al., "Enterprise Application Integration by means of a generic CORBA LDAP Gateway", *ACM*, (May 2002),711.

Sutherland, et al., "Enterprise Application Integration and Complex Adaptive Systems", *ACM*, (Oct. 2002),59-64.

Ballance, et al., "The Pan Language-Based Editing System for Integrated Development Environments", *ACM*, (Oct. 1990),77-93.

Dilts, et al., "An Inteligent Interface to CIM Multiple Data Bases", *ACM, TALIP*, (Mar. 2004),vol. 3 Issue 1, pp. 491-509.

"Requirement for Restriction/Election", U.S. Appl. No. 11/086,102, (Apr. 6, 2009),7 pages.

"Non Final Office Action", U.S. Appl. No. 10/975,827, (Apr. 7, 2009),38 pages.

"Final Office Action", U.S. Appl. No. 11/086,120, (Apr. 14, 2009),48 pages.

"Non Final Office Action", U.S. Appl. No. 11/645,292, (Apr. 17, 2009),40 pages.

"Final Office Action", U.S. Appl. No. 11/052,680, (Feb. 13, 2009),117 pages.

Flanagan, Roxy "Graphic + Internet related tutorials Using Winzip", indexed by www.archive.org,(Oct. 30, 2008),8 pages.

"Non Final Office Action", U.S. Appl. No. 11/645,190, (Mar. 13, 2009),41 pages.

"Non Final Office Action", U.S. Appl. No. 11/645,291, (Mar. 13, 2009),41 pages.

"Non Final Office Action", U.S. Appl. No. 11/645,193, (Mar. 16, 2009),41 pages.

"Notice of Allowance", U.S. Appl. No. 11/086,101, (Mar. 23, 2009),20 pages.

"Non Final Office Action", U.S. Appl. No. 11/052,680, (May 6, 2009),28 pages.

"Non Final Office Action", U.S. Appl. No. 11/645,300, (May 11, 2009),21 pages.

"Non Final Office Action", U.S. Appl. No. 11/645,302, (May 11, 2009),21 pages.

"Stuffit Deluxe", Aladdin Systems,(Jan. 1, 2004),83 pages.

Gu, T. et al., "Toward an OSGi-based infrastructure for context-aware applications", U.S. Appl. No. 11/645,190, Pervasive Computing IEEE, vol. 3, Issue 4. Digital Object Identifier 10.1109/MPRV.2004.19,(Oct.-Dec. 2004),9 pages.

Pantic, M et al., "Simple agent framework: an educational tool introducing the basics of AI programming", U.S. Appl. No. 11/645,190, Information Technology: Research and Education, 2003. Proceedings. ITRE2003.,(Aug. 11-13, 2003),426-430.

"Non Final Office Action", U.S. Appl. No. 11/086,102, (Jun. 2, 2009), 18 pages.

"Non Final Office Action", U.S. Appl. No. 11/645,306, (Jun. 4, 2009), 19 pages.

"Non Final Office Action", U.S. Appl. No. 10/975,623, (Jun. 9, 2009), 6 pages.

"Non Final Office Action", U.S. Appl. No. 11/086,121, (Jun. 22, 2009), 32 pages.

"Advisory Action", U.S. Appl. No. 11/086,121, (Sep. 11, 2009), 3 pages.

"Final Office Action", U.S. Appl. No. 11/052,680, (Oct. 5, 2009), 16 pages.

"Final Office Action", U.S. Appl. No. 11/086,211, (Sep. 29, 2009), 18 pages.

"Non Final Office Action", U.S. Appl. No. 11/086,120, (Aug. 13, 2009), 35 pages.

"Notice of Allowance", U.S. Appl. No. 11/645,190, (Sep. 17, 2009), 8 pages.

"Notice of Allowance", U.S. Appl. No. 11/645,193, (Sep. 17, 2009), 8 pages.

"Notice of Allowance", U.S. Appl. No. 11/645,291, (Oct. 1, 2009), 11 pages.

Praet, et al., "Processor Modeling and Code Selection for Retargetable Compilation", Jul. 2001, *ACM, TODAES* vol. 6, Issue 3, (Jul. 2001), pp. 277-307.

"Final Office Action", U.S. Appl. No. 11/086,102, (Oct. 20, 2009), 13 pages.

"Final Office Action", U.S. Appl. No. 10/975,827, (Nov. 23, 2009), 17 pages.

"Final Office Action", U.S. Appl. No. 10/975,146, (Dec. 1, 2009), 11 pages.

"Advisory Action", U.S. Appl. No. 11/086,120, (May 4, 2010), 3 pages.

"Advisory Action", U.S. Appl. No. 11/495,053, (May 26, 2010), 3 pages.

"Final Office Action", U.S. Appl. No. 11/086,120, (Feb. 23, 2010), 43 pages.

"Final Office Action", U.S. Appl. No. 11/495,053, (Mar. 17, 2010), 17 pages.

"Final Office Action", U.S. Appl. No. 11/052,680, (May 17, 2010), 12 pages.

"Final Office Action", U.S. Appl. No. 11/645,301, (May 12, 2010), 32 pages.

"Final Office Action", U.S. Appl. No. 11/645,303, (May 21, 2010), 32 pages.

"Non Final Office Action", U.S. Appl. No. 10/975,827, (Mar. 25, 2010), 19 pages.

"Non Final Office Action", U.S. Appl. No. 11/439,059, (Mar. 26, 2010), 6 pages.

"Non Final Office Action", U.S. Appl. No. 11/645,191, (May 5, 2010), 17 pages.

"Non Final Office Action", U.S. Appl. No. 11/645,192, (May 4, 2010), 14 pages.

"Non Final Office Action", U.S. Appl. No. 11/645,194, (Mar. 26, 2010), 26 pages.

"Non Final Office Action", U.S. Appl. No. 11/645,196, (Apr. 28, 2010), 29 pages.

"Non Final Office Action", U.S. Appl. No. 11/645,198, (Apr. 12, 2010), 14 pages.

"Non Final Office Action", U.S. Appl. No. 11/645,200, (May 26, 2010), 34 pages.

"Non-Final Office Action", U.S. Appl. No. 11/052,680, (Feb. 4, 2010), 12 pages.

"Non-Final Office Action", U.S. Appl. No. 11/086,101, (Sep. 2, 2009), 20 pages.

"Non-Final Office Action", U.S. Appl. No. 11/086,102, (Mar. 5, 2010), 15 pages.

"Non-Final Office Action", U.S. Appl. No. 11/086,121, (Dec. 30, 2009), 25 pages.

"Non-Final Office Action", U.S. Appl. No. 11/439,059, (Oct. 30, 2009), 9 pages.

"Non-Final Office Action", U.S. Appl. No. 11/495,053, (Jun. 10, 2009), 13 pages.

"Non-Final Office Action", U.S. Appl. No. 11/645,195, (Apr. 15, 2010), 20 pages.

"Non-Final Office Action", U.S. Appl. No. 11/645,301, (Jan. 6, 2010), 25 pages.

"Non-Final Office Action", U.S. Appl. No. 11/645,303, (Feb. 8, 2010), 18 pages.

"Non-Final Office Action", U.S. Appl. No. 10/975,623, (Nov. 12, 2009), 8 pages.

"Notice of Allowance", U.S. Appl. No. 10/975,623, (Feb. 23, 2010), 9 pages.

"Notice of Allowance", U.S. Appl. No. 11/086,101, (Feb. 25, 2010), 9 pages.

"Notice of Allowance", U.S. Appl. No. 11/645,292, (Nov. 17, 2009), 9 pages.

"Notice of Allowance", U.S. Appl. No. 11/645,300, (Nov. 18, 2009), 9 pages.

"Notice of Allowance", U.S. Appl. No. 11/645,302, (Nov. 17, 2009), 8 pages.

"Notice of Allowance", U.S. Appl. No. 11/645,306, (Nov. 17, 2009), 8 pages.

"Restriction Requirement", U.S. Appl. No. 11/645,191, (Jan. 28, 2010), 7 pages.

"Restriction Requirement", U.S. Appl. No. 11/645,192, (Jan. 28, 2010), 6 pages.

"Restriction Requirement", U.S. Appl. No. 11/645,198, (Jan. 28, 2010), 6 pages.

"Restriction Requirement", U.S. Appl. No. 11/645,200, (Feb. 26, 2010), 8 pages.

Adnan, Syed et al., "A Survey of Mobile Agent Systems", CSE 221, Final Project, Jun. 13, 2000., 12 pages.

Bagci, et al., "Communication and Security Extensions for a Ubiquitous Mobile Agent System (UbiMAS)", *In Proceedings of CF 2005*, Available at <http://portal.acm.org/ft_gateway.cfm?id=1062302&type=pdf&coll=GUIDE&dl=GUIDE& CFID=91857573& CFTOKEN=53726080>,(May 2005), pp. 246-251.

Baumann, J. et al., "Mole 3.0: A Middleware for Java-Based Mobile Software Agents", (1998), 18 pages.

Bigus, J.P. et al., "ABLE: A toolkit for building multiagent autonomic systems", IBM Systems Journal, vol. 41, No. 3, 2002.,(2002), 22 pages.

Blackwell, John "Ramit—Rule-Based Alert Management Information Tool", *Thesis, Florida State University College of Arts and Sciences*, (2004), pp. 1-69.

Brandt, Raimund "Dynamic Adaptation of Mobile Code in Heterogenous Environments", Der Teschnischen Universitat Munchen,(Feb. 15, 2001), 76 pages.

Brazier, F.M.T. et al., "Generative Migration of Agents", Department of Computer Science, Faculty of Sciences, Vrije Universiteit Amsterdam; de Boelelaan 1081a, 1081 HV Amsterdam, The Netherlands {frances, bjo, steen, niek} @cs.vu.l,(Aug. 2002), 4 pages.

Bursell, Michael et al., "Comparison of autonomous mobile agent technologies", (May 12, 1997), 28 pages.

Christopoulou, Eleni et al., "An ontology-based context management and reasoning process for UbiComp applications", Research Academic Computer Technology Institute, Research Unit 3, Design of Ambient Information Systems Group, N. Kazantzaki str., Rio Campus, 26500, Patras, Greece {hristope, goumop, kameas} @cti.gr,(Oct. 2005), 6 pages.

Forte, "Feature Comparison of Agent and Free Agent", Retrieved from: <www.forteinc.com/agent/features.php> on Jul. 26, 2010, (2002), 3 pages.

Hasegawa, Tetsou et al., "Inoperability for mobile agents by incarnation agents", AAMAS; Melbourne, Australia; ACM, 1-58113-683, pp. 1006-1007,(Jul. 14, 2003), 2 pages.

Jih, Wan-Rong et al., "Context-aware Access Control in Pervasive Healthcare", Computer Science and Information Engineering, National Taiwan University, Taiwan. jih@agents.csie.ntu.edu.tw, {r93070, yjhsu} @csie.ntu.edu.tw,(2005), 8 pages.

Karnik, Neeran M., et al., "Security in the Ajanta Mobile Agent System", Softw. Pract. Exper. 31, 4 (Apr. 2001), 301-329,(2001), 28 pages.

Korba, Larry "Towards Secure Agent Distribution and Communication", In Proceedings of the 32nd Annual Hawaii International Conference on System Science—vol. 8 (Jan. 5-8, 1999). HICSS. IEEE Computer Society, Washington, DC, 8059.,(1999), 10 pages.

Lockemann, Peter C., "Agents and Databases: Friends or Foes?", *Proceedings of the 9th International Database Engineering & Application Symposium (IDEAS '05)*, (2005), 11 pages.

Pauline, Siu Po Lam "Context-Aware State Management for Supporting Mobility in a Pervasive Environment", A thesis submitted to The University of Hong Kong in fulfillment of the thesis requirement for the degree of Master of Philosophy.,(Aug. 2004), 106 pages.

Poggi, Agostino et al., "Security and Trust in Agent-Oriented Middleware", OTM Workshops 2003: 989-1003,(2003), 15 pages.

Qui-Sheng, He et al., "A Lightweight Architecture to Support Context-Aware Ubiquitous Agent System", Department of Computer Science and Engineering, Fudan University, Shanghai 200433, Chain {hequisheng, sltu} @fudan.edu.cn,(Aug. 2006), 6 pages.

Russell, Stuart et al., "Artificial Intelligence: A Modern Approach", *Pearson*, (2003), pp. 5, 32-56, 449-454.

Stallings, William "ISDN and Broadband ISDN with Frame Relay and ATM", *Prentice-Hall*, (1999),5 pages.

Sterritt, Roy et al., "From Here to Autonomicity: Self-Managing Agents and the Biological Metaphors that Inspire Them", Integrated Design and Process Technology, pp. 143-150.,(Jun. 2005), 8 pages.

Walsh, Tom et al., "Security and Reliability in Concordia", In Mobility: Processes, Computers, and Agents ACM Press/Addison-Wesley Publishing Co., New York, NY, 524-534.,(1999), 10 pages.

Yu, Ping et al., "Mobile Agent Enabled Application Mobility for Pervasive Computing", Internet and Mobile Computing Lab, Department of Computing, Hong Kong Polytechnic University, Hung Hom, Kowloon, Hong Kong {cspyu, csjcao, cswen} @comp.polyu.edu.hk., (Aug. 2006), 10 pages.

"Advisory Action", U.S. Appl. No. 11/052,680, (Jul. 28, 2010), 3 pages.

"Advisory Action", U.S. Appl. No. 11/645,303, (Jul. 28, 2010), 3 pages.

"Final Office Action", U.S. Appl. No. 11/086,102, (Jul. 1, 2010), 14 pages.

"Final Office Action", U.S. Appl. No. 11/086,121, (Jun. 16, 2010), 30 pages.

"Non Final Office Action", U.S. Appl. No. 11/645,301, (Jul. 30, 2010), 18 pages.

"Non Final Office Action", U.S. Appl. No. 11/645,303, (Aug. 19, 2010), 20 pages.

"Non-Final Office Action", U.S. Appl. No. 12/647,964, (Sep. 8, 2010), 5 pages.

"Notice of Allowability", U.S. Appl. No. 10/975,146, (Jul. 13, 2010), 2 pages.

"Notice of Allowance", U.S. Appl. No. 11/439,059, (Jul. 14, 2010), 12 pages.

"Notice of Allowance", U.S. Appl. No. 11/495,053, (Aug. 31, 2010), 7 pages.

"The Sims", *Sims, Electronic Arts*, (2000), 57 pages.

"WOW, World of Warcraft", *Wikipedia (online)*, Retreived from Internet in 2010, <URL:http://en.wikipedia.org/wiki/World_of_Warcraft>, (2010), 28 pages.

Barba, Rick "The Sims Prima's Official Strategy Guide", *Prima Publishing; ISBN: 7615-2339-1*, (2000), 98 Pages.

Chang, Yao-Chung et al., "All-IP Convergent Communications over Open Service Architecture", *2005 Wireless Telecommunications Symposium, IEEE, 0-7803-8856*, (2005), pp. 202-210.

Hinchey, Michael G., et al., "Formal Approaches to Agent-Based Systems", *2nd International Workshop FAABS*, (Oct. 2002), 291 pages.

Rosenberg, Jonathan et al., "Programming Internet Telephony Services", *IEEE Network*, (May/Jun. 1999), 8 pages.

Taylor, T.L. "Does WoW Change Everything?", *Games and Culture*, vol. 1, Num. 4, (Oct. 2006), 20 pages.

"Final Office Action", U.S. Appl. No. 10/975,827, (Sep. 15, 2010), 22 pages.

"Final Office Action", U.S. Appl. No. 11/645,192, (Sep. 15, 2010), 14 pages.

"Final Office Action", U.S. Appl. No. 11/645,194, (Sep. 15, 2010), 28 pages.

"Final Office Action", U.S. Appl. No. 11/645,196, (Sep. 22, 2010), 33 pages.

"Final Office Action", U.S. Appl. No. 11/645,198, (Sep. 16, 2010), 22 pages.

"Notice of Allowance", U.S. Appl. No. 12/714,753, (Sep. 27, 2010), 7 pages.

Erfurth, Christian et al., "Migration Intelligence for Mobile Agents", *Cited by examiner in* U.S. Appl. No. 11/645,192 on Sep. 15, 2010, (2001), 8 pages.

"Final Office Action", Application, (Oct. 21, 2010), 34 pages.

"Final Office Action", U.S. Appl. No. 11/645,191, (Oct. 28, 2010), 19 pages.

"Non Final Office Action", U.S. Appl. No. 11/052,680, (Nov. 19, 2010), 17 pages.

"Notice of Allowance", U.S. Appl. No. 11/086,121, (Oct. 7, 2010), 6 pages.

"Notice of Allowance", U.S. Appl. No. 11/645,195, (Oct. 7, 2010), 8 pages.

"Notice of Allowance", U.S. Appl. No. 12/647,964, (Nov. 30, 2010), 7 pages.

Singh, V.K. et al., "DYSWIS: An architecture for automated diagnosis of networks", U.S. Appl. No. 11/645,190, Operations and Management Symposium, 2008. NOMS 2008. IEEE,(Apr. 7-11, 2008),851-854.

"Non Final Office Action", U.S. Appl. No. 10/975,146, (May 26, 2009),21 pages.

\* cited by examiner

WEB SERVICE INTERFACE FOR MOBILE AGENTS

FIELD OF THE INVENTION

The present invention is generally related to software agents and more particularly to a Web Service interface for mobile agents.

Agents

A software agent is a software abstraction, similar to the object-oriented programming concept of an object. The concept of an agent provides a convenient and powerful way to describe a complex software entity that is capable of acting with a certain degree of autonomy in order to accomplish tasks on behalf of its user. But unlike objects, which are defined in terms of methods and attributes, an agent is defined in terms of its behavior.

Various authors have proposed different definitions of agents, commonly including concepts such as:

Persistence—code is not executed on demand but runs continuously and decides for itself when it should perform some activity Autonomy—agents have capabilities of task selection, prioritization, goal-directed behavior, decision-making without human intervention Social Ability—agents are able to engage other components through communication and coordination, they may collaborate on a task Reactivity—agents perceive the context in which they operate and react to it appropriately.

Agents may also be mobile. They can move from one execution environment to another carrying both their code and their execution state. These execution environments can exist in a variety of devices in a data network including, but not limited to, servers, desktops, laptops, embedded devices, networking equipment and edge devices such as PDAs or cell phones. The characteristics of these platforms may vary widely in terms of computational capacity, networking capacity, display capabilities, etc. An agent must be able to adapt to these conditions.

Historically, agents have been programmed in a procedural manner. That is, agents are programmed with a series of steps that will ultimately result in a goal being achieved. This approach has limitations though as the logic for each agent must be compiled into the agent software and is therefore static. Complex goals can also become intractable for a programmer as the set of rules the agent must follow grows.

Web Services

According to the W3C, a Web Service is a software system designed to support interoperable machine-to-machine interaction over a network. It has an interface that is described in a machine process able format such as Web Services Description Language (WSDL). Other systems interact with a Web Service in a manner prescribed by its interface using messages, which are typically enclosed in a Simple Object Access Protocol (SOAP) envelope. These messages are often carried over Hypertext Transfer Protocol (HTTP) and normally comprise Extensible Markup Language (XML) in conjunction with other web-related standards. Software programs written in various languages can use Web Services to exchange data over a network such as the internet.

There are a number of advantages of using Web Services. First and foremost, Web Services provide interoperability between software applications running on disparate platforms and operating systems. Second, Web Services use open standards and protocols for exchanging data. Third, the use of HTTP as a transport protocol for Web Service messaging enables Web Service to work through many common firewall security measures without altering the configuration of the firewall.

Therefore, what is needed is an ability to provide a Web Service interface into a mobile agent.

SUMMARY OF THE INVENTION

The present invention provides a system, method, and computer readable medium for allowing a client application that can communicate via the Web Service protocol, (SOAP) to communicate with any mobile agent, without knowledge of where the agent is located, or what language it is written in.

Currently Web Service implementations, or servers, are stationary, are not mobile and can only be reside on robust enterprise computers, be they servers or desktops. Additionally, if its address is changed, the URL of the Web Service also changes, thus negatively impacting the client application software that is accessing the Web Service In one embodiment of the present invention, a system for communicating with agents that are resident and move between embedded devices is possible.

In another embodiment of the present invention, a system for communicating with mobile software agents that are resident on and move between wireless devices is possible.

In a further embodiment of the present invention, a system for communicating with mobile software agents that are resident on and move between handheld devices is possible.

In a further embodiment of the present invention, a system for communicating with mobile software agents that are resident on and move between any combination of enterprise servers, laptops, desktops, embedded devices, wireless devices and handheld devices is possible.

In one embodiment, a method for enabling a web service interface for a mobile agent comprises receiving a tool including data, the data comprising an agent interface file, a URL identifying a name and an initial execution environment of the agent, a name of the web service, and a name of the web service WSDL file, and receiving a request to generate by the tool a web service interface based on the data.

In another embodiment, a system for a web service request handled by a mobile agent comprises an execution environment, a web service client residing in the execution environment, a web service, and a web server, wherein the web service client initiates a request to the web service running in the web server residing in the execution environment.

DETAILED DESCRIPTION OF THE INVENTION

A Web Service essentially consists of three parts—a client which makes the requests to the Web Service, a server which handles the client request on the web server, and the service logic which typically handles the client requests. In this case though, as per the teachings of this invention, the service logic delegates the handling of requests to a mobile agent which may be located in an execution environment resident on a device in a computer, data or communications network.

Figure 1:
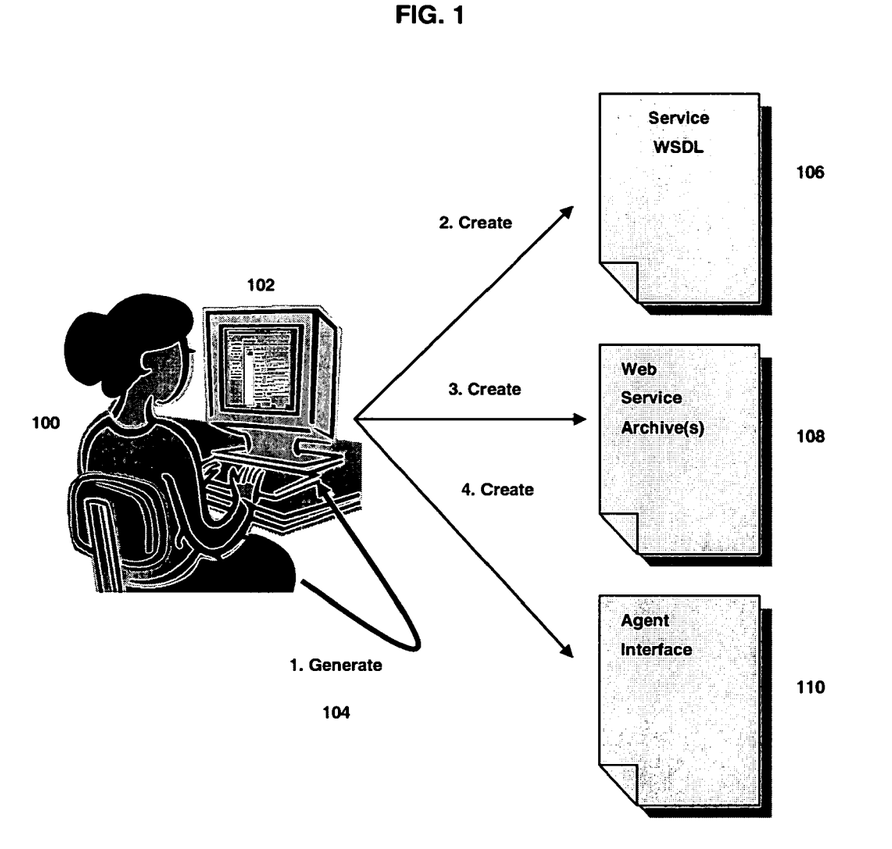
FIG. 1 is a diagram illustrating an exemplary process of a tool generating software to enable a Web Service interface for a mobile agent.

Referring now to FIG. 1, a diagram illustrating an exemplary process of a tool generating software to enable a Web Service interface for a mobile agent is shown. A user 100 supplies a tool 102 with an agent interface file, a URL identifying the name and initial execution environment of the agent, the name of the Web Service and the name of the Web Service WSDL file. The user 100 then requests that the tool 102 generate a Web Service interface based on the data supplied. The tool 102 generates three files. The first is a WSDL file 106 which specifies the interface to use when developing clients for this Web Service. The WSDL file 106 is created by translating the agent interface file into WSDL. The second output of the generation process is one or more Java archive files 108 that will be deployed to a Web Service container within the hosting web server. This archive contains the generated implementation of the Web Service which locates and delegates requests to an agent. A next possible output of the generation process is the interface which the mobile agent 110 should implement. This interface 110 enables the Web Service to proxy requests to and responses from the mobile agent. Another possible output of the generation process is the generation of a Web Service proxy. This Web Service proxy is the implementation of the interface 110 that communicates directly with the agent.

Figure 2:
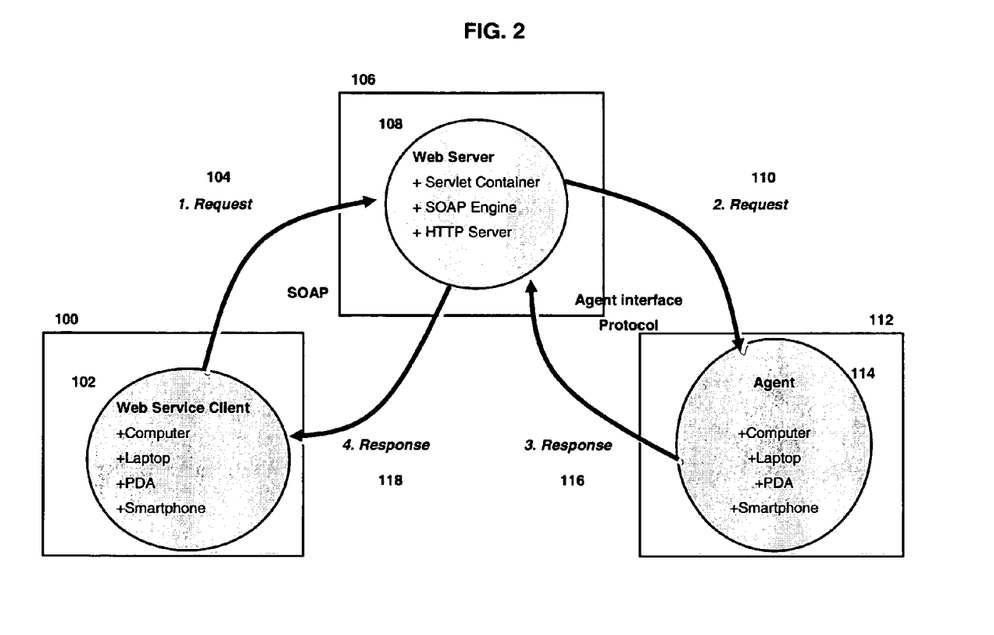
FIG. 2 is a diagram illustrating an exemplary process of a Web Service request being handled by a mobile agent.

Referring now to FIG. 2, a diagram illustrating an exemplary process of a Web Service request being handled by a mobile agent is shown. A Web Service client 102, residing in execution environment 100, initiates a request 104 to a Web Service running in web server 108 residing in execution environment 106. The Web Service running in web server 108 locates as associated mobile agent 114 resident in execution environment 112 though the use of a name server (not shown). The service maps parameters from the request document and proxies the request 110, in a protocol compliant with the agent interface, to the agent 114. Upon receipt of the request, the agent handles the request. Once handling is complete, a response 116, which includes the result of the request, is constructed and sent back to the Web Service running in web server 108. The result is received by the Web Service, which maps the result to a response document and returns the response 118 to the Web Service client 102.

An agent developer simply needs to provide the current software interface and optionally, the Web Service address (e.g. URL) for the mobile agent the developer wishes to expose as a Web Service. From this information, the agent tool and/or agent middleware will automatically create all of the necessary software to expose the agent as a Web Service and make it accessible to Web Services clients. More specifically what is generated is the agent Web Service Definition Language interface file, any Web Service support software and the Web Service archive files that are necessary for deployment to the Web Service container Systems, methods, devices and computer readable media have been shown and/or described in the above embodiments for creating and utilizing a Web Service interface for a mobile agent. Although the above descriptions set forth preferred embodiments, it will be understood that there is no intent to limit the invention by such disclosure, but rather, it is intended to cover all modifications and alternate implementations falling within the spirit and scope of the invention. For example, the present invention should not be limited to a single agent, or to a particular programming language for the execution environment. Furthermore, the association of agent to execution environments is not limited to the topology depicted. Lastly, the embodiments are intended to cover capabilities and concepts whether they be via a loosely couple set of components or they be converged into one or more integrated components, devices, circuits, and/or software programs. For example, the web server may be embedded and within the mobile agent platform.

What is claimed is:

1. A method comprising:
   receiving, with a tool of a computing device, data comprising an agent interface file, a uniform resource locator (URL) identifying a name and an initial execution environment of a mobile agent, and a name of a web service;
   generating a web service definition language (WSDL) file which specifies an interface to use when developing clients for the web service, wherein the WSDL file is generated by translating the agent interface file into WSDL;
   generating, with the tool of the computing device, a web service interface based on the data, wherein the mobile agent is configured to be moved to different execution environments and to carry an execution state of the mobile agent to the different execution environments; and
   configuring the web service interface, at least in part, to enable a location of the mobile agent to be identified and for requests to be delegated from the web service to the mobile agent.

2. The method of claim 1, further comprising generating one or more archive files that are deployed to a web services container within a hosting web server.

3. The method of claim 2, wherein the one or more archive files contain a generated implementation of the web service which locates and delegates requests to the mobile agent.

4. The method of claim 1, further comprising generating an interface that is implemented by the mobile agent.

5. The method of claim 4, wherein generating the interface that is implemented by the mobile agent includes generating the interface as configured to enable the web service to proxy requests to and responses from the mobile agent.

6. The method of claim 1, further comprising generating a web service proxy.

7. The method of claim 6, wherein the web service proxy is configured to communicate directly with the mobile agent.

8. A system comprising:
   a computing device that includes a processor and an execution environment, wherein the processor is configured to:
      receive data comprising an agent interface file, a uniform resource locator (URL) identifying a name and an initial execution environment of a mobile agent, and a name of a web service;
      generate a web service definition language (WSDL) file which specifies an interface to use when developing clients for the web service, wherein the WSDL file is generated by translating the agent interface file into WSDL; and
      generate a web service interface based on the data and
   a web server residing in the execution environment, wherein the web server comprises the web service that is executed by the processor and configured to:
      receive a request from a web service client; and
      enable the mobile agent to handle the request, wherein the mobile agent is configured to be moved to different execution environments and to carry an execution state of the mobile agent to the different execution environments, wherein the web service includes the web service interface that is configured, at least in part, to enable a location of the mobile agent to be identified and delegation of the request from the web service to the mobile agent.

9. The system of claim 8, wherein the web service is further configured to locate an associated mobile agent through the use of a name server.

10. The system of claim 9, wherein the web service is further configured to proxy the request to the mobile agent in a protocol compliant with an interface of the mobile agent.

11. The system of claim 9, wherein the web service is further configured to receive a response to the request from the mobile agent, wherein the response includes a result of the request.

12. The system of claim 11, wherein the web service is further configured to map a constructed response to a response document and to send the response to the web service client.

13. The system of claim 8, wherein the web service is further configured to map parameters from a request document.

14. A non-transitory computer readable medium having stored thereon, computer executable instructions, the computer executable instructions comprising:

instructions to receive data comprising at least one of an agent interface file, a uniform resource locator (URL) identifying a name and an initial execution environment for a mobile agent, and a name of a web service;

instructions to generate a web service definition language (WSDL) file which specifies an interface to use when developing clients for the web service, wherein the WSDL file is generated by translating the agent interface file into WSDL; and instructions to receive a request to generate a web service interface based on the data, wherein the web service interface is configured, at least in part, to enable a location of the mobile agent to be identified, wherein the mobile agent is configured to be moved to different execution environments and to carry an execution state of the mobile agent to the different execution environments, and wherein the web service interface is further configured to enable requests to be delegated from the web service to the mobile agent.

* * * * *

UNITED STATES PATENT AND TRADEMARK OFFICE
CERTIFICATE OF CORRECTION

| | | |
|---|---|---|
| PATENT NO. | : 8,132,179 B1 | Page 1 of 1 |
| APPLICATION NO. | : 11/645197 | |
| DATED | : March 6, 2012 | |
| INVENTOR(S) | : DeAnna | |

It is certified that error appears in the above-identified patent and that said Letters Patent is hereby corrected as shown below:

Title Page 3, item (56), under "Other Publications", in Column 1, Line 9, delete "Inteligent" and insert -- Intelligent --.

Title Page 4, item (56), under "Other Publications", in Column 1, Line 54, delete "Jul. 26, 2010," and insert -- Jan. 26, 2010, --.

Title Page 4, item (56), under "Other Publications", in Column 2, Line 47, delete "Retreived" and insert -- Retrieved --.

Column 4, Line 54, in Claim 8, delete "data and" and insert -- data; and --.

Signed and Sealed this
Twenty-fifth Day of September, 2012

David J. Kappos
*Director of the United States Patent and Trademark Office*